(12) United States Patent
Andrieu et al.

(10) Patent No.: US 6,261,721 B1
(45) Date of Patent: Jul. 17, 2001

(54) CELL HAVING A SEPARATOR COMPRISING A MACROPOROUS MATRIX AND A POROUS POLYMER

(75) Inventors: Xavier Andrieu, Bretigny sur Orge; Francois Boudin, Arpajon; Christophe Jehoulet, Le Plessis Pate, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/291,760

(22) Filed: Apr. 14, 1999

(30) Foreign Application Priority Data

Apr. 16, 1998 (FR) .................................................. 98 04753

(51) Int. Cl.$^7$ ....................................................... H01M 2/16
(52) U.S. Cl. .......................... 429/249; 429/247; 429/246
(58) Field of Search ..................................... 429/249, 247, 429/246

(56) References Cited

U.S. PATENT DOCUMENTS 4,098,930 * 7/1978 Nakayama et al. .................. 427/246
5,811,205 * 9/1998 Andrieu et al. ...................... 429/137

FOREIGN PATENT DOCUMENTS

| 2364690 | 4/1978 | (FR) . |
| 9-306460 | 11/1997 | (JP) . |
| WO 96/20504 | 4/1996 | (WO) . |

\* cited by examiner

*Primary Examiner*—Laura Weriner
(74) *Attorney, Agent, or Firm*—Sughrue, Mion, Zinn, Macpeak & Seas, PLLC

(57) ABSTRACT

A cell includes a separator comprising a felt type macroporous matrix the pores of which contain a PVDF type microporous polymer. The microporous polymer is placed in the macroporous matrix by impregnating the matrix with a solution containing the polymer. A method of preparing the cell includes the following steps: a bonding solution is produced containing a polymer, a solvent and a non-solvent; the macroporous matrix is impregnated with the solution; the impregnated macroporous matrix and the two electrodes are brought into contact to form an electrode assembly; and the assembly is dried to eliminate the solvent and the non-solvent.

16 Claims, 1 Drawing Sheet

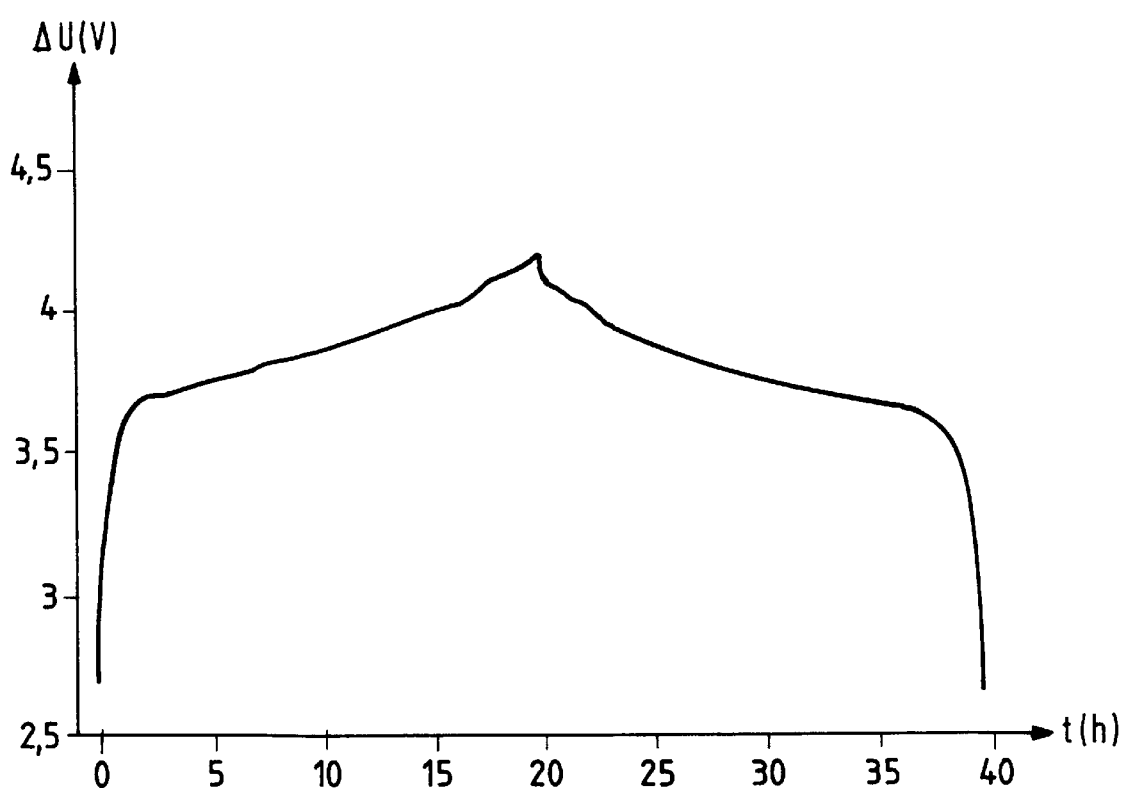

CELL HAVING A SEPARATOR COMPRISING A MACROPOROUS MATRIX AND A POROUS POLYMER

BACKGROUND OF THE INVENTION

1. Field of the invention

The present invention concerns a cell comprising a separator comprising a macroporous matrix and a porous polymer and the method of manufacturing it.

2. Description of the prior art

Conventional cells comprise solid electrodes on opposite sides of a separator containing the liquid electrolyte. A separator can be a macroporous body impregnated with the electrolyte, for example. Another, modern type of conventional "separator" is a porous or non-porous gelled polyvinylidene fluoride polymer containing the liquid electrolyte.

Various methods of manufacturing this type of cell have been proposed, including processes involving the separate manufacture of the electrodes and the separator followed by their combination using various techniques. These techniques include rolling (BellCore, U.S. Pat. No. 5,456,000, U.S. Pat. No. 5,460,904, U.S. Pat. No. 5,540,741, U.S. Pat. No. 5,552,239) and adhesive bonding (Electrofuels, U.S. Pat. No. 5,437,692, U.S. Pat. No. 5,512,389).

Also, document U.S. Pat. No. 5,639,573 describes a separator comprising a multiphase polymer support structure comprising at least a porous first phase and a polymer second phase dispersed in the pores of said porous first phase. The dispersed polymer phase absorbs the organic electrolyte; it is not porous.

These techniques are not entirely satisfactory, however, because the separator is sometimes crushed, which causes short circuits. Assembly also requires careful handling.

Moreover, the skilled person is still confronted with the standard problem of the loss of mechanical properties to the detriment of conductivity properties, and vice versa.

An aim of the invention is therefore a new cell comprising a separator having increased mechanical resistance to crushing and enabling easy assembly.

SUMMARY OF THE INVENTION

Accordingly, the invention provides a cell comprising a separator comprising a macroporous matrix the pores of which contain a microporous polymer, placed in said macroporous matrix by impregnating said matrix with a solution containing said polymer. Generally, the microporous polymer, after having been placed in said macroporous matrix chemically by impregnation, is gelled following its impregnation by the electrolyte.

The cell in accordance with the invention advantageously comprises a separator of homogeneous structure, even in the presence of a few localized heterogeneities, because it is prepared chemically, by impregnating practically all of the macroporous matrix with a solution including the microporous polymer. The separator of the cell in accordance with the invention is therefore practically single-layered.

Another advantage of the cell in accordance with the invention is that the porosity of the separator in said cell is high, the final porosity generally being in the range from 35% to 90% and preferably in the range from 50% to 90%. This facilitates manufacture of said cell by the methods generally employed, which will be explained hereinafter. In particular, the possibility of crushing said separator during manufacture, which leads to unwanted short circuits, is greatly reduced or even virtually eliminated.

The microporous polymer typically has a pore volume in the range from 35% to 95%. It typically has pores with an average diameter in the range from 0.1 $\mu$m to 5 $\mu$m, generally in the order of 1 $\mu$m.

The microporous polymer can be selected from polyvinylidene fluoride (PVDF), polyvinyl chloride (PVC), polymethyl methacrylate (PMMA), polybutyl methacrylate (PBMA), polyacrylonitrile (PAN), polyvinylformal, cellulose polyacetate, a polysulfone, a polyether, a polyolefin such as polyethylene (PE), polyethylene oxide (PEO), polypropylene (PP), their copolymers, copolymers of polyvinylidene fluoride and polyethylene tetrafluoride and copolymers of polyvinylidene fluoride and polyhexene hexafluoride, copolymers of polyvinyl acetate and polyvinyl alcohol, and their alloys, and alloys of polyvinylidene fluoride with a polymer selected from a polysulfone, polymethyl methacrylate and polyvinylpyrrolidone.

The microporous polymer is advantageously polyvinylidene fluoride, a copolymer thereof or an alloy thereof.

The macroporous matrix is "impregnated" with the microporous polymer. The matrix for the microporous polymer is substantially rigid.

The macroporous matrix typically has an initial pore volume in the range from 35% to 95%. It typically has pores whose average diameter is in the range from 5 $\mu$m to 50 $\mu$m, generally in the order of 10 $\mu$m.

The macroporous matrix can be selected from, for example, organic or inorganic felts, especially polymer felts, woven separators, macroporous materials obtained by processes such as phase inversion or by mechanical means. A preferred matrix is a polymer felt formed of a woven or non-woven fabric defining interstices (or pores) between the fibers. The felt can be made from a polyolefin (PE, PP, etc) or polyamide or any other material.

The pores or interstices of the matrix and of the polymer have average diameters enabling the polymer to occupy the pores or interstices of the matrix. In general, the ratio of the average pore diameter of the macroporous matrix to the average pore diameter of the microporous polymer is in the range from 2 to 50, and this ratio is conventionally in the order of 10.

The polymer may also comprise an elastomer (which in some cases can completely replace it), and possibly an inorganic substance.

The elastomer can be a polyurethane, an acrylonitrile/butadiene copolymer, a styrene/butadiene/styrene copolymer, a styrene/isoprene/styrene copolymer, a polyester or polyether with amide blocks, etc. The elastomer can be present in various amounts. The inorganic substance can be silica.

The separator in accordance with the invention is of standard thickness, which can be in the range from 10 $\mu$m to 100 $\mu$m.

In one embodiment of the invention the separator is made by a preparation method that comprises forming the microporous polymer in situ in the pores of the macroporous matrix.

All conventional processes of forming the microporous polymer in situ in the pores of the macroporous matrix are appropriate; for example, a solution of the polymer in a solvent with a plasticizing agent can be used, by evaporating the solvent and extracting the plasticizer.

The microporous polymer is preferably prepared using the phase inversion technique.

In a first embodiment, which operates by immersion, the method of making the separator of the cell in accordance with the invention comprises the following steps:

a solution of said polymer dissolved in a solvent, possibly with additives, is produced;

said macroporous matrix is impregnated with said solution;

the impregnated matrix is immersed in a non-solvent that is miscible with said solvent; and said impregnated matrix is dried to eliminate said solvent and said non-solvent.

In a second embodiment, which operates by evaporation, the method of making the separator of the cell in accordance with the invention comprises the following steps:

a solution of said polymer dissolved in a solvent, possibly with additives, is prepared, said solution further containing a non-solvent that is miscible with said solvent, in a proportion that is insufficient to precipitate said polymer;

said macroporous matrix is impregnated with said solution; and said macroporous matrix is dried to eliminate said solvent and said non-solvent.

The impregnation can be performed by dipping the matrix into a bath or by coating it with the solution or by any other appropriate method. The solutions can be heated before the macroporous matrix is impregnated.

The term "solvent" means an organic solvent in which the polymer (and possibly the elastomer) dissolves easily at the working temperature and which can be easily eliminated by heating to a moderate temperature. The term "non-solvent" means a liquid in which the polymer (and possibly the elastomer) is not soluble (strong non-solvent) or only very slightly soluble (weak non-solvent) at the working temperature.

The boiling point of the solvent (and/or its volatility) is preferably less than the boiling point (and/or the volatility) of the non-solvent. Accordingly, during evaporation, the solution is enriched with non-solvent until the polymer phase becomes insoluble in the liquid phase and precipitates out. For example, the boiling point of the solvent is in the range from 40° C. to 80° C. and that of the non-solvent is greater than 100° C.

The skilled person knows how to determine which solvents and non-solvents are the most appropriate for preparing the solutions.

The polymer (possibly with the elastomer) is dissolved in the solvent (possibly with the non-solvent). The polymer concentration is one of the parameters that condition the final porosity. The polymer concentration by weight is preferably in the range from 5% to 50% and advantageously in the range from 10% to 25%.

The impregnated matrix can be dried in two steps, first at a temperature in the range from 20° C. to 60° C., for example, and then at a temperature in the range from 80° C. to 140° C., for example, or at a single temperature, for example directly at a temperature in the range from 80° C. to 140° C.

A preliminary step of applying a wetting agent and an additional step of cross-linking the polymer may be envisaged.

The cell in accordance with the invention conventionally comprises two electrodes, an anode and a cathode; the electrodes are advantageously porous (having a porosity in the range from 35% to 90%, for example) and include an electrochemically active material, which is conventionally retained in a matrix or binder, preferably of polymer. The binder polymer can be selected from the polymers previously cited, in particular PVDF, or a PVDF copolymer or alloy, or cellulose derivatives (CMC, HPMC, HEC, HPC, etc), polyacrylic acid, polyacrylamide, elastomers such as NBR, SBR, etc. The method of making the electrodes is conventional; in particular, the electrode is manufactured by depositing a paste onto an appropriate support such as an expanded metal, a grid, a tape or a metallic foam, so forming the collectors. The collectors are advantageously perforated; the perforations encourage evaporation of the solvents during implementation of the preferred method of preparing the cell.

The anode advantageously includes carbon, such as graphited carbon, graphite, coke, vitreous carbon, carbon black or active carbon, able to intercalate and to de-intercalate lithium usually issuing initially from the cathode.

The cathode advantageously comprises at least one lithium-containing oxide of a transition metal such as the lithium-containing oxides of vanadium, manganese, nickel and cobalt.

The cell also comprises, by way of a conventional electrolyte, a lithium salt dissolved in an organic solvent.

The organic solvent is generally an ether or an ester and can be selected from alkyl carbonates, linear or branched, such as propylene carbonate (PC), ethylene carbonate (EC), butylene carbonate (BC), diethyl carbonate (DEC), dimethyl carbonate (DMC), and mixtures thereof.

The lithium salt is generally a fluorine-containing lithium salt and can be selected, for example, from lithium perchlorate $LiClO_4$, lithium hexafluoroarsenate (LiAsF6), lithium hexafluorophosphate ($LiPF_6$), lithium tetrafluoroborate ($LiBF_4$), lithium trifluoromethanesulfonate ($LiCF_3SO_3$), lithium trifluoromethanesulfonimide ($LiN(CF_3SO_2)_2$ or LITFSI), and lithium trifluoromethanesulfonemethide ($LiC(CF_3SO_2)_2$ or LiTFSM).

The invention also concerns a method of preparing a cell in accordance with the invention.

The cell can be assembled using various processes. These processes include rolling the various prefabricated components of said cell and impregnation with the electrolyte. Said rolling step is generally followed by said impregnation step, but said rolling step can also follow said impregnation step. The various prefabricated components could be impregnated with the electrolyte before the rolling is carried out. The skilled person knows the rolling conditions. A step of extracting a plasticizer can also be provided, if necessary.

A method including a bonding step can be used: this method comprises the following steps:

a separator in accordance with the invention and two electrodes are prepared;

at least one free face between the separator and each electrode is coated with a bonding solution; and the separator and the two electrodes are brought into contact to form an electrode assembly.

The electrodes can be brought into contact with the separator simultaneously or sequentially.

The bonding solution is advantageously a solution comprising:

a polymer, and possibly additives;

a solvent in which the polymer dissolves easily at the working temperature; and a non-solvent that can be mixed with said solvent, which does not dissolve the polymer much or at all at the working temperature, in a proportion that is insufficient to precipitate the polymer.

When the bonding solution has been applied and the electrodes placed on the separator, slight pressure is applied, in particular to obtain a uniform thickness of the electrode assembly, after which the solvent and the non-solvent are evaporated.

The adhesive can be based on any polymer or a polymer of the same chemical formula as the polymer forming the binder (or matrix) of an electrode, possibly with the electrochemically active material of the electrode, or on a polymer with the same chemical formula as the microporous polymer. The adhesive is preferably based on the latter polymer, selected from the group cited above.

In one particularly preferred embodiment the method of manufacturing the cell comprises fabricating the separator in situ, the bonding solution being also used at the same time to make the separator.

Accordingly, in one particularly preferred embodiment, the method of preparing the cell in accordance with the invention comprises the following steps:

a bonding solution is prepared containing a polymer, and possibly additives, a solvent in which said polymer dissolves easily at the working temperature and a non-solvent that is miscible with said solvent, which dissolves said polymer little if at all at the working temperature, in a proportion insufficient to precipitate said polymer;

said macroporous matrix is impregnated with said solution;

the impregnated macroporous matrix and said two electrodes are brought into contact to form an electrode assembly; and said assembly is dried to eliminate said solvent and said non-solvent.

The step of impregnating the macroporous matrix can be effected:

by immersing said matrix in a bath of said solution;

by coating said matrix on both faces with said solution;

by coating said matrix on one face only with said solution.

In the first case, the matrix impregnated with the solution can be brought into contact with the two electrodes simultaneously or sequentially; (light) pressure is then applied.

In the second case, the two faces can be coated simultaneously or sequentially and the two electrodes applied simultaneously or sequentially, respectively; sufficient (light) pressure is then applied for the solution to penetrate substantially totally into the matrix from both faces.

In the third case, one electrode and the matrix are brought into contact, the free face is coated and then the second electrode is bonded; sufficient (light) pressure is then applied for the solution to penetrate substantially totally into the matrix from the coated face.

The preferred method of making the cell in accordance with the invention comprises the following steps:

a bonding solution is prepared containing a polymer, and possibly additives, a solvent in which said polymer dissolves easily at the working temperature and a non-solvent that is miscible with said solvent, which dissolves said polymer little if at all at the working temperature, in a proportion insufficient to precipitate said polymer;

said macroporous matrix is coated with said solution on one or both faces;

the coated macroporous matrix and said two electrodes are brought into contact to form an electrode assembly;

sufficient pressure is applied for said solution to penetrate substantially totally into said matrix from the coated face or faces; and the assembly is dried to eliminate said solvent and said non-solvent.

A previous step of applying a wetting agent, such as a volatile organic solvent, and an additional step of cross-linking the polymer are also feasible.

The drying step is implemented as above for the separator alone, for example at a temperature in the range from 20° C. to 140° C. (for example in two stages, first at a temperature in the range from 20° C. to 60° C. and then at a temperature in the range from 80° C. to 140° C., possibly in a vacuum). The duration of the drying step is sufficient to assure total elimination of the solvents.

A rolling step can also be provided.

The bonding solution is preferably based on a polymer selected from polyvinylidene fluoride (PVDF), polyvinyl chloride (PVC), polymethyl methacrylate (PMMA), polybutyl methacrylate (PBMA), polyacrylonitrile (PAN), polyvinylformal, cellulose polyacetate, a polysulfone, a polyether, a polyolefin such as polyethylene (PE), polyethylene oxide (PEO), polypropylene (PP), their copolymers, copolymers of polyvinylidene fluoride and polyethylene tetrafluoride and copolymers of polyvinylidene fluoride and polyhexene hexafluoride, copolymers of polyvinyl acetate and polyvinyl alcohol, and their alloys, and alloys of polyvinylidene fluoride with a polymer selected from a polysulfone, polymethyl acrylate and polyvinylpyrrolidone. The adhesive is advantageously based on polyvinylidene fluoride, a copolymer thereof or an alloy thereof.

The terms "solvent" and "non-solvent" have the meanings explained above for the method described for making the separator. In particular, the boiling point of the solvent is in the range from 40° C. to 80° C. and that of the non-solvent is greater than 100° C.

As previously, the skilled person can determine which solvents and which non-solvents are the most appropriate for preparing the solutions. For example, if the polymer is PVDF or a copolymer or an alloy, the solvent is selected from acetone and tetrohydrofuran, for example, and the non-solvent is selected from butanol, propanol and ethylene glycol.

The bonding solution comprises the solvent and the non-solvent in proportions by weight in the range from 75/25 to 90/10; the polymer generally accounts for 5% to 50% by weight of the solution, preferably 10% to 25% by weight.

The bonding solution may be prepared as follows: the polymer (possibly with the elastomer) that will form the microporous medium is dissolved in the solvent, after which the non-solvent is added; the working temperature is adjusted so that the polymer/solvent/non-solvent solution is homogeneous and stable. The solution may be heated if necessary.

Apart from the drying step, the method may be carried out at a low temperature, for example a temperature in the range between 15° C. and 50° C.; this temperature may be ambient temperature, for example.

On completing the steps described above, an electrode assembly is obtained that is impregnated with the organic electrolyte to obtain the final cell required.

This lost method offers the advantage of simple manufacture with a limited number of steps and produces individual cells having good mechanical and electrical properties.

BRIEF DESCRIPTION OF THE DRAWINGS

The invention will now be described in more detail, by way of non-limiting example, with reference to FIG. 1, which shows how the voltage of the cell in accordance with the invention varies during a charge/discharge cycle.

DETAILED DESCRIPTION OF THE PREFERRED EMBODIMENTS

The anode is prepared from a paste comprising graphite as the electrochemically active material dispersed in an NBR/CMC (1/1) binder. The porous electrode is placed on a perforated copper colledor.

The cathode is prepared from a paste comprising $LiCoO_2$ as the electrochemically active material dispersed in a PVDF binder. The porous electrode is placed on a perforated aluminum collector.

A Freudenberg® polyolefin felt 60 $\mu$m thick, of 80% porosity and having an average pore diameter of approximately 8 $\mu$m is prepared and placed on the anode.

A (bonding) solution is also prepared comprising 75% by weight acetone, 12.5% by weight butanol and 12.5% by weight PVDF. The solution is obtained by dissolving the PVDF in the acetone and then adding the butanol. The PVDF obtained in this way has 70% porosity and an average pore diameter in the range from 0.5 $\mu$m to 1 $\mu$m.

The felt disposed on the anode is then coated, these components being impregnated with the solution, and then covered with the cathode. Slight pressure is applied so that the bonding solution impregnates the felt and the faces of the two electrodes.

At a pressure of 1 $kg/cm^2$, the solvents are then evaporated for two hours at 25° C. and then in a vacuum for 12 hours at 120° C. to obtain an electrode assembly in which the separator has approximately 56% porosity.

It is then impregnated with an electrolyte comprising a 1M solution of $LiPF_6$ in a PC/EC/DMC (1/1/3) mixture. The impregnated electrode assembly is mounted in a button cell.

A cell is finally obtained having a surface area of 40 $cm^2$, a nominal capacity of 110 mAh and a thickness of 0.3 mm.

The cell is charge/discharge cycled at C/20, beginning with two training cycles at 60° C.

FIG. 1 shows a charge followed by discharge cycle at ambient temperature, the cell voltage $\Delta U$ in volts (V) being plotted on the ordinate axis and the time t in hours (h) on the abscissa axis.

The invention is not limited to the embodiments described but is susceptible to many variations readily apparent to the skilled person; in particular, the invention is not limited to button cells, and any type of cell is feasible, in particular prism-shaped, cylindrical, spiral, etc cells. Similarly, any electrochemically active material and any polymer binder known per se can be used to prepare the electrodes.

There is claimed:

1. A cell comprising a separator comprising a macroporous matrix the pores of which contain a microporous polymer, placed in said macroporous matrix by impregnating said matrix with a solution containing said polymer, wherein said microporous polymer has a pore volume in the range from 35% to 95%.

2. The cell claimed in claim 1 wherein said microporous polymer has an average pore diameter in the range from 0.1 $\mu$m to 5 $\mu$m.

3. The cell claimed in claim 1 wherein said microporous polymer is selected from polyvinylidene fluoride, polyvinyl chloride, polymethyl methacrylate, polybutyl methacrylate, polyacrylonitrile, polyvinylformal, cellulose polyacetate, a polysulfone, a polyether, a polyolefin, their copolymers, copolymers of polyvinylidene fluoride and polethylene tetrafluoride and copolymers of polyvinylidene fluoride and polyhexene hexafluoride, copolymers of polyvinyl acetate and polyvinyl alcohol, and their alloys, and alloys of polyvinylidene fluoride with a polymer selected from a polysulfone, polymethyl methacrylate and polyvinylpyrrolidone.

4. The cell claimed in claim 3 wherein said microporous polymer is polyvinylidene fluoride, a copolymer thereof or an alloy thereof.

5. The cell claimed in claim 1 wherein said macroporous matrix has an initial pore volume in the range from 35% to 95%.

6. The cell claimed in claim 1 wherein said macroporous matrix has an average pore diameter in the range from 5 $\mu$m to 50 $\mu$m.

7. The cell claimed in claim 1 wherein said macroporous matrix is selected from the group, consisting of organic or inorganic felts, woven separators, and macroporous materials obtained by processes such as phase inversion or by mechanical means.

8. The cell claimed in claim 1 wherein said macroporous matrix is a polymer felt formed from a woven or non-woven fabric.

9. The cell claimed in claim 1 wherein the ratio of the average pore diameter of said macroporous matrix to the average pore diameter of said microporous polymer is in the range from 2 to 50.

10. The cell claimed in claim 1 having a porosity in the range frozen 35% to 90%.

11. The cell claimed in claim 1 in which said separator is prepared by a method comprising the following steps:

producing a solution of said polymer dissolved in a solvent;

impregnating said microporous matrix with said solution;

immersing the impregnated matrix in a non-solvent that is miscible with said solvent; and drying said impregnated matrix to eliminate said solvent and said non-solvent.

12. The cell of claim 11, wherein said producing step comprises dissolving a microporous polymer and at least one additive in a solvent.

13. The cell claimed in claim 1 wherein said separator is prepared by a method comprising the following steps:

preparing a solution of said polymer dissolved in a solvent, said solution fiber containing a non-solvent that is miscible with said solvent, in a proportion that is insufficient to precipitate said polymer;

impregnating said macroporous matrix with said solution; and drying said macroporous matrix to eliminate said solvent and said non-solvent.

14. The cell of claim 13, wherein said preparing step comprises dissolving a microporous polymer and at least one additive in a solvent.

15. The cell claimed in claim 1, including an anode comprising carbon and a cathode comprising at least one lithium-containing transition metal oxide.

16. A cell comprising a separator comprising a macroporous matrix the pores of which contain a microporous polymer, placed in said macroporous matrix by impregnating said matrix with a solution containing said polymer, wherein said microporous polymer has an average pore diameter in the range from 0.1 $\mu$m to 5 $\mu$m.

* * * * *